(No Model.)

J. H. SMITH & W. A. LANDIS.
EGG TESTER.

No. 573,305. Patented Dec. 15, 1896.

WITNESSES
A. B. Deggers
L. S. Heinrichs

INVENTORS
Joseph H. Smith
and William A. Landis
by E. E. Masson, Attorney.

UNITED STATES PATENT OFFICE.

JOSEPH H. SMITH AND WILLIAM A. LANDIS, OF ST. CLOUD, MINNESOTA.

EGG-TESTER.

SPECIFICATION forming part of Letters Patent No. 573,305, dated December 15, 1896.

Application filed June 1, 1893. Renewed June 11, 1896. Serial No. 595,226. (No model.)

*To all whom it may concern:*

Be it known that we, JOSEPH H. SMITH and WILLIAM A. LANDIS, citizens of the United States, residing at St. Cloud, in the county of Stearns, State of Minnesota, have invented certain new and useful Improvements in Egg-Testing Devices, of which the following is a specification, reference being had therein to the accompanying drawings.

The objects of our improvement are to provide simple and inexpensive means for rapidly transferring eggs into a testing device, submitting them to an examination to observe their translucidity or soundness, and transferring them again either into the same package or into another suitable package or receptacle, and incidentally counting them without requiring the operator to touch the eggs with his hands. We attain these objects by the construction illustrated in the accompanying drawings, in which—

Figure 1:
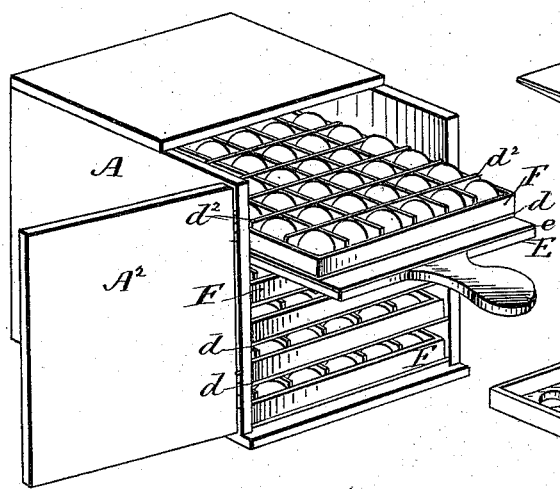
Figure 2:
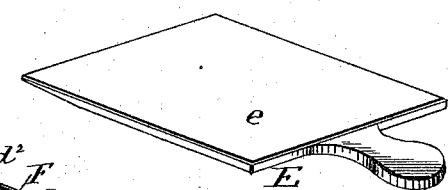
Figure 3:
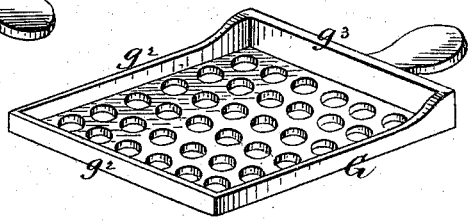
Figure 4:
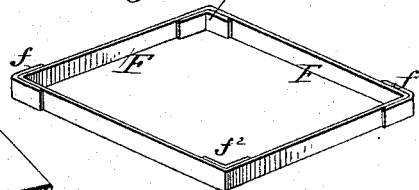
Figure 5:
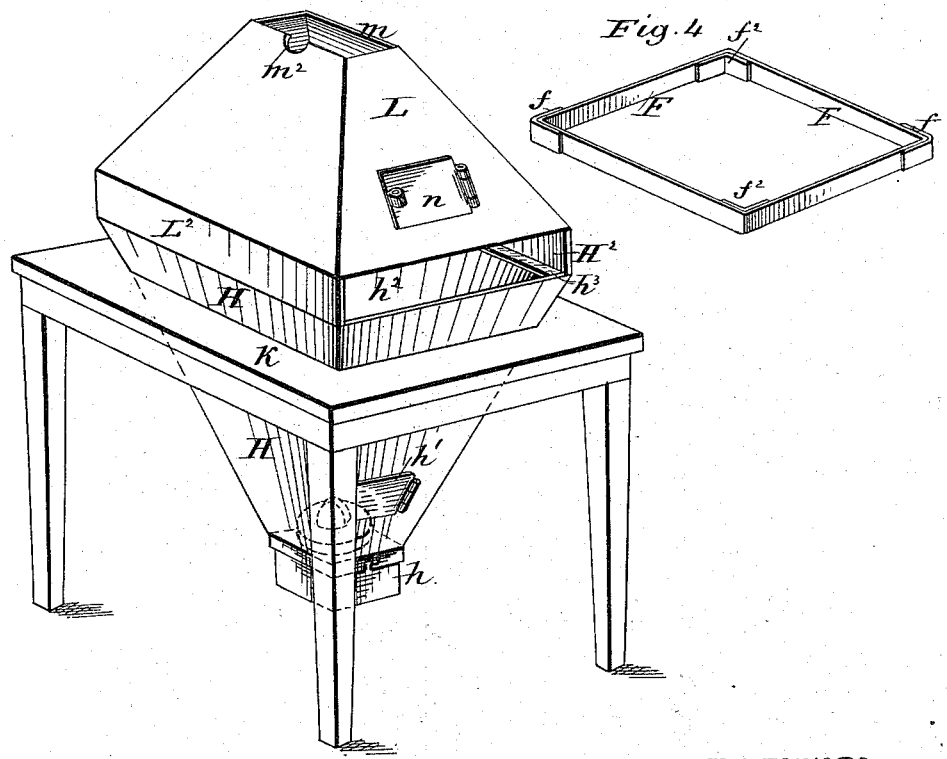

Figure 1 is a perspective view of a box nearly full of eggs packed in accordance with our invention, the box being shown with its side open and part of its top removed and a tray of eggs partly withdrawn from said box upon a peel forming a part of our invention. Fig. 2 is a perspective view of the peel. Fig. 3 is a perspective view of the drawer used to retain a tier of eggs in proper position to be examined in the egg-testing device. Fig. 4 is a perspective view of the frame used to inclose a tier of eggs while being transferred from the box of eggs to the perforated drawer. Fig. 5 is a perspective view showing the egg-tester with an opening in its side for the introduction of the egg-carrying drawer.

In said drawings, A represents an egg-packing box having one of its sides adapted to be conveniently opened or closed by a board or door $A^2$, preferably hinged to one of the walls of the box. Within said box the eggs B are packed as close as possible with safety and introduced therein upon trays consisting of detached superposed pieces, preferably of pasteboard. Said pieces consist of, first, a rectangular sheet of veneer or pasteboard $d$, upon which are placed upon their edge a series of pasteboard strips $d^2$, having slits in their edge about one inch and a half apart and extending half-way of the width of said strips, with which similarly-slotted strips are made to engage by straddling them through the slits in a manner well known by egg packers and shippers. In this manner rectangular pockets are obtained, into each one of which an egg can be placed, well separated from the eggs in the adjacent pockets; but to complete the sides of the outer rows of pockets and permit a tray full of eggs to be carried upon a sideless peel, as shown at E, a rectangular frame F is made to surround the ends of all the strips $d^2$ and its lower edge made to rest upon the sheet of pasteboard $d$. The frame F consists of a narrow strip of pasteboard transversely creased at suitable distances apart or of shorter strips united together by small patches $f$ and $f^2$ of strong paper or cloth glued to the ends of said short strips, the opposite patches $f$ being preferably on the outside and the patches $f^2$ on the inside surface of the strips to permit the frame to be folded with two of its adjacent sides in close contact, and thus occupy less space when shipped empty.

To permit a tray of eggs of, for example, three dozen, as shown in the drawings, to be rapidly examined at once in regard to their translucidity or soundness either before packing them in the box A or after a full box, as A, has been received and its side opened, the peel E, which has its top preferably covered with felt $e$, is inserted under the bottom sheet $d$, and the whole is withdrawn from the box. The drawer G is then turned upside down upon the tray of eggs, the number of holes $g$ in the bottom of said drawer corresponding with the number and location of the eggs upon the peel and the sides $g^2$, inclosing the rectangular frame F of the tray of eggs. The peel and drawer being then held together by the operator, he reverses their positions by turning the whole over, causing the drawer to be at the bottom and the peel on top. The peel and the pasteboard $d$ are then removed, leaving the thirty-six eggs in the drawer, one end of each egg in one of the holes $g$ in proper position for examination in the egg-testing device constructed for the reception of said drawer.

Said egg-testing device consists of an inverted pyramid H of sheet metal supported upon a platform or table K, through which its lower portion is made to pass. In the lower end of said pyramid is inserted a lamp $h$, suitably secured thereto either by means of springs or of bayonet-joints, so as to be easily removed when it is desired to fill it with oil or to trim the wick. In the side of the pyramid H adjacent to the lamp is an opening through which the lamp can be lighted, but normally said opening is closed by a door $h'$. On top of the widest part of the pyramid H there is a vertical rectangular inclosure $H^2$, having in one of its sides a rectangular opening $h^2$ with narrow internal shelves $h^3$ adjacent to said opening. The opening $h^2$ is equal in size with the highest side $g^3$ of the drawer G, so that the latter will prevent the entrance of light within the pyramid, the only light desired being that produced by the lamp $h$, which light is reflected by the bright tinned interior surfaces of the pyramid H. On top of the pyramid H is placed a pyramidal cover L, having pendent from its lower edge a vertical rim $L^2$, corresponding in form with the inclosure $H^2$, but encircling three of its sides. The inner surface of the cover L is blackened to absorb any rays of light that may penetrate thereunder through the oblong slit or opening $m$ in the apex of the cover, while the operator with his eyes close to said opening observes the transparency of each of the thirty-six eggs in the drawer, inserted under the cover L through the opening $h^2$. A semicircular recess $m^2$, formed in the cover alongside of the opening $m$, is to receive the nose of the operator and permit his eyes and forehead to occupy a position close to the opening $m$. In one of the sides of the cover is an opening normally closed by a door $n$. Said opening is of sufficient size to permit the operator to remove from the drawer any egg that appears opaque while being examined through the opening in the apex of the cover. After having examined all the eggs on the drawer he removes it with its load from the tester. He then replaces the sheet of pasteboard $d$ on top of the eggs and the peel upon the pasteboard, and while holding the peel and drawer together turns them over. He then removes the drawer from over the eggs and with the aid of the peel replaces the tray of eggs in the box A or in another receptacle, or in a box of similar size.

The above operation can be promptly repeated for each tray of eggs without touching any of them except those that are opaque and of doubtful quality.

Having now fully described our invention, we claim—

1. An egg-tester consisting of a pyramidal lower half or section, a support therefor, a pyramidal cover having in its apex an opening provided with the recess $m^2$ and at its lower edge a vertical rim $L^2$ provided with the rectangular opening $h^2$ substantially as and for the purpose described.

2. An egg-tester consisting of two substantially pyramidal sections, the lower section being of sheet metal constituting reflectors, and provided with a lighting device, the vertical portion uniting said sections and provided with a rectangular opening, and the perforated drawer G for carrying the eggs and adapted when inserted, to close the opening $h^2$ as specified.

In testimony whereof we affix our signatures in presence of two witnesses.

JOSEPH H. SMITH.
WILLIAM A. LANDIS.

Witnesses:
ANDREW C. ROBERTSON,
JOS. F. EDELBROCO.